(12) United States Patent
Kim et al.

(10) Patent No.: US 12,366,738 B2
(45) Date of Patent: Jul. 22, 2025

(54) OPTICAL IMAGING SYSTEM

(71) Applicant: SAMSUNG ELECTRO-MECHANICS CO., LTD., Suwon-si (KR)

(72) Inventors: Hag Chul Kim, Suwon-si (KR); Yong Joo Jo, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 18/421,183

(22) Filed: Jan. 24, 2024

(65) Prior Publication Data

US 2024/0159997 A1 May 16, 2024

Related U.S. Application Data

(63) Continuation of application No. 17/369,274, filed on Jul. 7, 2021, now Pat. No. 11,914,126, which is a
(Continued)

(30) Foreign Application Priority Data

Apr. 18, 2018 (KR) .................. 10-2018-0044964
Sep. 28, 2018 (KR) .................. 10-2018-0115988

(51) Int. Cl.
*G02B 15/177* (2006.01)
*G02B 5/04* (2006.01)
(Continued)

(52) U.S. Cl.
CPC ............ *G02B 15/177* (2013.01); *G02B 5/04* (2013.01); *G02B 13/002* (2013.01); *G02B 13/009* (2013.01); *G02B 13/02* (2013.01)

(58) Field of Classification Search
CPC ...... G02B 15/177; G02B 5/04; G02B 13/002; G02B 13/009; G02B 13/02;
(Continued)

(56) References Cited

U.S. PATENT DOCUMENTS 9,706,093 B2 * 7/2017 Chen .................. G02B 9/64
10,802,251 B2 10/2020 Lin et al.
(Continued)

FOREIGN PATENT DOCUMENTS

CN 1749798 A 3/2006
CN 1758083 A 4/2006
(Continued)

OTHER PUBLICATIONS

Chinese Office Action dated Jan. 7, 2021 issued in counterpart Chinese Patent Application No. 201910307306.4 (5 pages in English)(8 pages in Chinese).
(Continued)

*Primary Examiner* — Tuyen Tra
(74) *Attorney, Agent, or Firm* — NSIP Law (57) ABSTRACT

An optical imaging system includes a first lens group that can move in an optical direction and has negative refractive power; a second lens group that can move in the optical direction and has positive refractive power; and a third lens group that can move in the optical direction and has negative refractive power. The first lens group, the second lens group, and the third lens group include seven lenses in total, and at least one of the seven lenses includes an aspherical surface.

14 Claims, 6 Drawing Sheets

Related U.S. Application Data continuation of application No. 16/295,055, filed on Mar. 7, 2019, now Pat. No. 11,092,789.

(51) Int. Cl.
  *G02B 13/00* (2006.01)
  *G02B 13/02* (2006.01)

(58) Field of Classification Search
  CPC ........ G02B 13/0065; G02B 15/143503; G02B 13/0045; G02B 13/0015; G02B 9/64; G02B 13/18; G02B 15/22
  See application file for complete search history.

(56) References Cited

U.S. PATENT DOCUMENTS

| | | |
|---|---|---|
| 2006/0056048 A1 | 3/2006 | Sato et al. |
| 2006/0066953 A1 | 3/2006 | Nishio et al. |
| 2007/0247727 A1 | 10/2007 | Kim |
| 2008/0106800 A1 | 5/2008 | Shin |
| 2013/0335605 A1 | 12/2013 | Kuo |
| 2015/0109485 A1 | 4/2015 | Ozaki et al. |
| 2015/0234166 A1 | 8/2015 | Maetaki |
| 2015/0378131 A1* | 12/2015 | Tang ................ G02B 9/64 359/708 |
| 2016/0187622 A1 | 6/2016 | Huang |
| 2017/0192203 A1* | 7/2017 | Chang ............... G02B 13/0045 |
| 2017/0351067 A1 | 12/2017 | Kubota et al. |
| 2018/0024314 A1 | 1/2018 | Tashiro |

FOREIGN PATENT DOCUMENTS

| | | |
|---|---|---|
| CN | 101295070 A | 10/2008 |
| CN | 107577034 A | 1/2018 |
| EP | 2 053 440 A2 | 4/2009 |
| EP | 2 053 440 A3 | 1/2010 |
| JP | 8-313802 A | 11/1996 |
| JP | 2001-290076 A | 10/2001 |
| JP | 2014-6275 A | 1/2014 |
| JP | 2015-79229 A | 4/2015 |
| KR | 10-0800811 B1 | 2/2008 |
| KR | 10-1837371 B1 | 3/2018 |

OTHER PUBLICATIONS

Chinese Office Action issued on May 9, 2022, in counterpart Chinese Patent Application No. 202110917191.8 (7 pages in English and 9 pages in Chinese).

Chinese Office Action issued on Sep. 2, 2022, in counterpart Chinese Patent Application No. 202110917191.8 (8 Pages in English, 8 Pages in Chinese).

Korean Office Action Issued on Feb. 8, 2024, in Counterpart Korean Patent Application No. 10-2018-0115988 (6 Pages in English, 5 Pages in Korean).

Korean Office Action issued on Oct. 24, 2024, in counterpart Korean Patent Application No. 10-2018-0115988 (6 pages in English, 5 pages in Korean).

* cited by examiner

OPTICAL IMAGING SYSTEM

CROSS-REFERENCE TO RELATED APPLICATIONS

This application is a continuation of U.S. application Ser. No. 17/369,274 filed on Jul. 7, 2021, now U.S. Pat. No. 11,914,126 issued on Feb. 27, 2024, which is a continuation of U.S. application Ser. No. 16/295,055 filed on Mar. 7, 2019, now U.S. Pat. No. 11,092,789 issued on Aug. 17, 2021, which claims the benefit under 35 USC 119 (a) of Korean Patent Application No. 10-2018-0044964 filed on Apr. 18, 2018 and Korean Patent Application No. 10-2018-0115988 filed on Sep. 28, 2018 in the Korean Intellectual Property Office, the entire disclosures of which are incorporated herein by reference for all purposes.

BACKGROUND

1. Field

The following description relates to an optical imaging system capable of adjusting a focal length.

2. Description of Background

A collapsible optical imaging system in which a plurality of lenses is aligned in a row is configured such that the greater the number of lenses, the longer the overall length of the optical imaging system. For example, it may be more difficult to reduce a size of an optical imaging system including five lenses further than an optical imaging system including three lenses. For this reason, there may be a limitation in mounting a collapsible optical imaging system in a small-sized portable terminal device.

Differently from a collapsible optical imaging system, a curved optical imaging system may be configured such that an optical direction is curved using a prism, and a length from a foremost lens to an imaging plane may accordingly be reduced. However, the amount of displacement of a lens group to adjust a focus may be large in the curved optical imaging system, and thus, it may be difficult to reduce a size of the curved optical imaging system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens group that can move in an optical direction and has negative refractive power; a second lens group that can move in the optical direction and has positive refractive power; and a third lens group that can move in the optical direction and has negative refractive power. The first lens group, the second lens group, and the third lens group include seven lenses in total, and at least one of the seven lenses includes an aspherical surface.

At least one of the seven lenses may be made of a plastic material.

The first lens group may include two lenses having refractive power with different signs.

The second lens group may include three lenses, and the three lenses of the second lens group may be disposed such that the three lenses have refractive power having signs different from signs of refractive power of adjacent lenses in the second lens group.

The third lens group may include two lenses having refractive power with different signs.

The optical imaging system may include a refractive prism disposed in front of the first lens group.

In another general aspect, an optical imaging system includes a prism; a first lens having positive refractive power; a second lens having negative refractive power; a third lens having positive refractive power; a fourth lens having negative refractive power; a fifth lens having positive refractive power; a sixth lens having positive refractive power; and a seventh lens having negative refractive power. The prism and the first to seventh lenses are sequentially disposed from an object side.

The first lens may include a convex image-side surface.

The second lens may include a convex object-side surface.

The third lens may include a convex image-side surface.

The fourth lens may include a concave object-side surface.

The sixth lens may include a concave object-side surface.

The seventh lens may include a concave image-side surface.

The optical imaging system may satisfy $-1.0<(R1+R2)/(R1-R2)<-0.1$, where R1 is a radius of curvature of an object-side surface of the first lens, and R2 is a radius of curvature of an image-side surface of the first lens.

The optical imaging system may satisfy $0.11<Nd6-Nd7<0.13$, where Nd6 is a refractive index of the sixth lens, and Nd7 is a refractive index of the seventh lens.

At a wide-angle end of the optical imaging system, a distance D1 between the first lens group and the second lens group may be greater than a distance D3 between the third lens group and an imaging plane, and a distance D2 between the second lens group and the third lens group may be greater than D3.

D1/D2 may be within a range of 0.9 to 1.3, D2/D3 may be within a range of 1.5 to 2.2, and D1/D3 may be within a range of 1.5 to 3.5.

At a telephoto end of the optical imaging system, a distance D1 between the first lens group and the second lens group may be smaller than a distance D2 between the second lens group and the third lens group, and D2 may be smaller than a distance D3 between the third lens group and an imaging plane.

D1/D2 may be within a range of 0.2 to 0.4, D2/D3 may be within a range of 0.2 to 0.4, and D3/D1 may be within a range of 14 to 16.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described with reference to the attached drawings.

A first lens may refer to a lens disposed most adjacent to an object (or a subject), and a fifth lens may refer to a lens disposed most adjacent to an imaging plane (or an image sensor). In the examples, an entirety of a radius of curvature, a thickness, a TTL, an IMG HT (½ of an diagonal length of the imaging plane), and a focal length of a lens are indicated in millimeters (mm). Also, a thickness of a lens, a gap between lenses, and the TTL may be distances at an optical axis of a lens. In a description of a form of a lens, a surface of a lens being convex indicates that an optical axis region of the surface is convex, while a surface of a lens being concave indicates that an optical axis region of the surface is concave. Therefore, in a configuration in which a surface of a lens is described as being convex, an edge region of the lens may be concave. In a similar manner, in a configuration in which a surface of a lens is described as being concave, an edge region of the lens may be convex.

The optical imaging system may include an optical system including a plurality of lenses. For example, the optical system of the optical imaging system may include a plurality of lenses having refractive power. However, the optical imaging system does not only include the lenses having refractive power. For example, the optical imaging system may include a prism refracting incident light, and a stop for adjusting the amount of light. The optical imaging system may further include an infrared light blocking filter for blocking infrared light. The optical imaging system may further include an image sensor (an imaging device) for converting an image of a subject incident through the optical system into an electrical signal. The optical imaging system may further include a gap maintaining member for adjusting a distance between lenses.

The plurality of lenses may be made of a material having a refractive index different from a refractive index of air. For example, the plurality of lenses may be made of a glass material. At least one of the plurality of lenses may be aspherical. The aspherical surface may be represented by Equation 1 below.

$$Z = \frac{cr^2}{1 + \sqrt{1 - (1+k)c^2r^2}} + Ar^4 + Br^6 + Cr^8 + Dr^{10} + Er^{12} + Fr^{14} + Gr^{16} + Hr^{18} + Jr^{20}$$

Equation 1

In Equation 1, "c" is an inverse of a radius of a curvature of a respective lens, "K" is a conic constant, "r" is a distance from a certain point on an aspherical surface of the lens to an optical axis, "A" to "J" are aspheric constants, "Z" (or SAG) is a height from a certain point on an aspherical surface of the lens to an apex of the aspherical surface in an optical axis direction.

The optical imaging system may include a plurality of lens groups. For example, the optical imaging system may include a first lens group, a second lens group, and a third lens group. The first lens group, the second lens group, and the third lens group may be disposed in order along an optical axis.

The first lens group may include a plurality of lenses. For example, the first lens group may include a plurality of lenses having refractive power with different signs. For example, the first lens group may include a lens having positive refractive power and a lens having negative refractive power. Overall, lenses of the first lens group may have negative refractive power.

The second lens group may include a plurality of lenses. For example, the second lens group may include three lenses. The three lenses of the second lens group may be disposed such that one lens among the three lens may have refractive power having different signs from signs of refractive power of adjacent lenses. For example, the second lens group may include a lens having positive refractive power, a lens having negative refractive power, and a lens having positive refractive power. Overall, lenses of the second lens group may have positive refractive power.

The third lens group may include a plurality of lenses. For example, the third lens group may include a plurality of lenses having refractive power with different signs. For example, the third lens group may include a lens having positive refractive power and a lens having negative refractive power. Overall, lenses of the third lens group may have negative refractive power.

The first to third lens groups may move in an optical direction. For example, at least one or more of the first to third lens groups may move to change a focal length of the optical imaging system, and two or more of the first to third lens groups may move to adjust a focus of the optical imaging system. Thus, the optical imaging system may significantly change a variable magnification ratio. Further, in the optical imaging system, the plurality of lens groups may be driven to adjust a focus, and thus, a precise focus adjustment may be available in any variable magnification conditions, and a range of displacement of the lens groups to adjust a focus may be significantly reduced.

The optical imaging system may include a lens made of a plastic material. For example, the optical imaging system may be configured such that one of seven or more lenses included in the lens groups may be made of a plastic material.

The optical imaging system may include an aspherical lens. For example, the optical imaging system may be configured such that one of seven or more lenses included in the lens groups may be an aspherical lens.

The optical imaging system may include a prism, a filter, a stop, and an image sensor.

The prism may be disposed in an object side of the first lens group. The prism may include a material having a relatively low Abbe number. For example, a material of the prism may be selected from materials having an Abbe number of 25 or lower.

The filter may be disposed between the third lens group and the image sensor. The filter may block a certain wavelength of incident light to improve a resolution of the optical imaging system. For example, the filter may block infrared wavelengths of incident light.

The stop may be disposed between the first lens group and the second lens group.

The optical imaging system may satisfy one or more of the following first to seventh conditional expressions:

| | |
|---|---|
| $-1.5 < R2/f < -0.5$ | (Conditional Expression 1) |
| $-1.0 < (R1+R2)/(R1-R2) < -0.1$ | (Conditional Expression 2) |
| $0.1 < f/f1 < 0.8$ | (Conditional Expression 3) |
| $1.0 < f/f3 < 3.0$ | (Conditional Expression 4) |
| $-1.5 < f/f4 < -0.2$ | (Conditional Expression 5) |
| $0.2 < f/f5 < 1.0$ | (Conditional Expression 6) |
| $0.11 < N6 - N7 < 0.13$ | (Conditional Expression 7) |

In the conditional expressions, "f" is a focal length of the optical imaging system, R1 is a radius of curvature of an object-side surface of the first lens, R2 is a radius of curvature of an image-side surface of the first lens, f1 is a focal length of the first lens, f3 is a focal length of the third lens, f4 is a focal length of the fourth lens, f5 is a focal length of the fifth lens, N6 is a refractive index of the sixth lens, and N7 is a refractive index of the seventh lens.

In the following description, various examples of the optical imaging system will be described.

Figure 1:
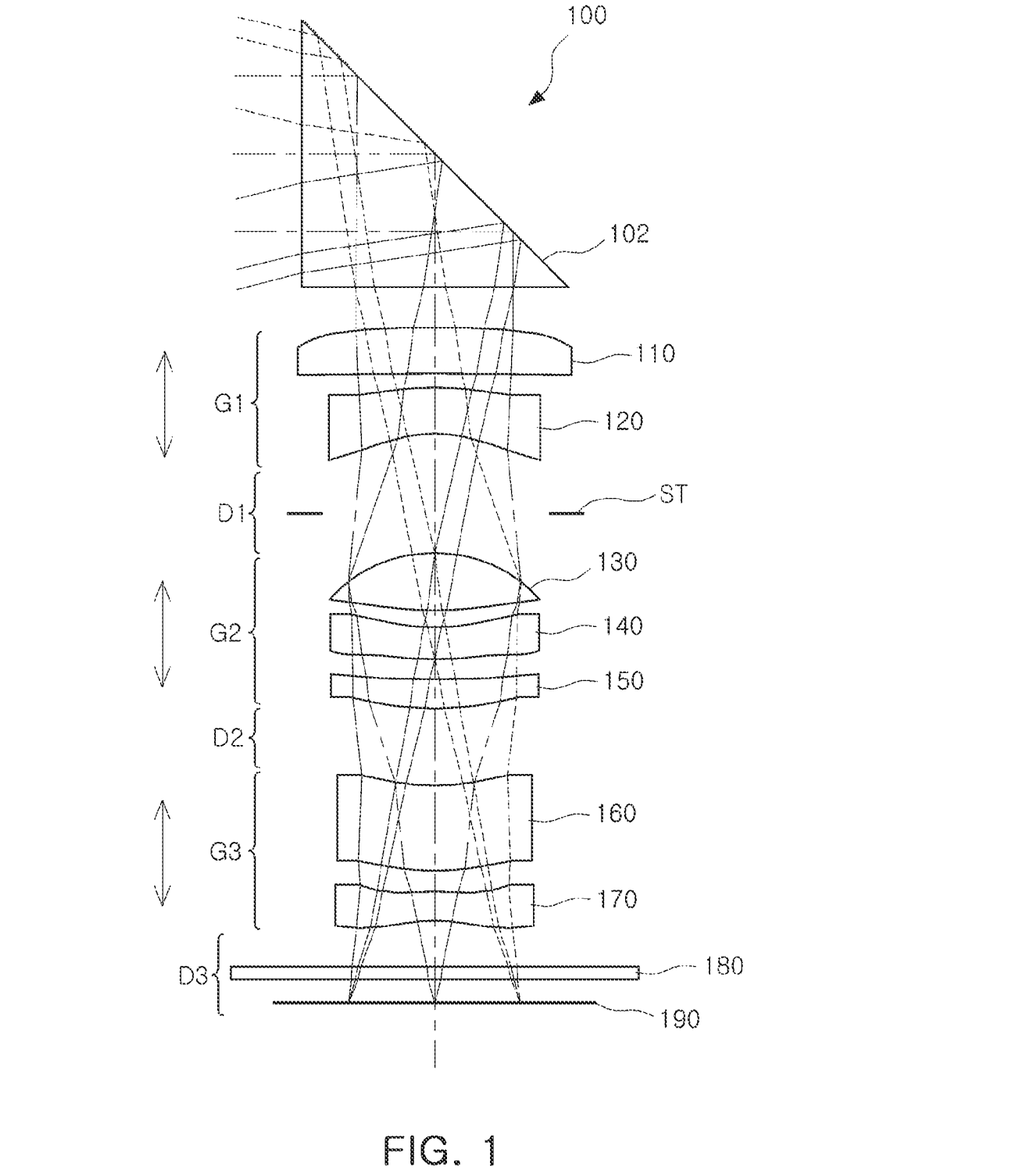
FIG. 1 is a diagram illustrating a first example of an optical imaging system.

A first example of the optical imaging system will be described with reference to FIG. 1.

The optical imaging system 100 may include a prism 102, a first lens 110, a second lens 120, a third lens 130, a fourth lens 140, a fifth lens 150, a sixth lens 160, and a seventh lens 170, and may be divided into a plurality of lens groups. For example, the optical imaging system 100 may be divided into a first lens group G1, a second lens group G2, and a third lens group G3. The first lens group G1 may include two lenses. For example, the first lens group G1 may include the first lens 110 and the second lens 120. The first lens 110 may have positive refractive power, and may have a convex object-side surface and a convex image-side surface. The second lens 120 may have negative refractive power, and may have a convex object-side surface and a concave image-side surface. The second lens group G2 may include three lenses. For example, the second lens group G2 may include the third lens 130, the fourth lens 140, and the fifth lens 150. The third lens 130 may have positive refractive power, and may have a convex object-side surface and a convex image-side surface. The fourth lens 140 may have negative refractive power, and may have a concave object-side surface and a convex image-side surface. The fifth lens 150 may have positive refractive power, and may have a concave object-side surface and a convex image-side surface. The third lens group G3 may include two lenses. For example, the third lens group G3 may include the sixth lens 160 and the seventh lens 170. The sixth lens 160 may have positive refractive power, and may have a concave object-side surface and a convex image-side surface. The seventh lens 170 may have negative refractive power, and may have a convex object-side surface and a concave image-side surface.

The lens groups G1, G2, and G3 may move in an optical direction to change a focal length of the optical imaging system. For example, a distance D1 between the first lens group G1 and the second lens group G2 and a distance D2 between the second lens group G2 and the third lens group G3 may be reduced as a focal length of the optical imaging system is lengthened. Also, a distance D3 between the third lens group G3 and the imaging plane may be increased as a focal length of the optical imaging system is lengthened.

Figure 2:
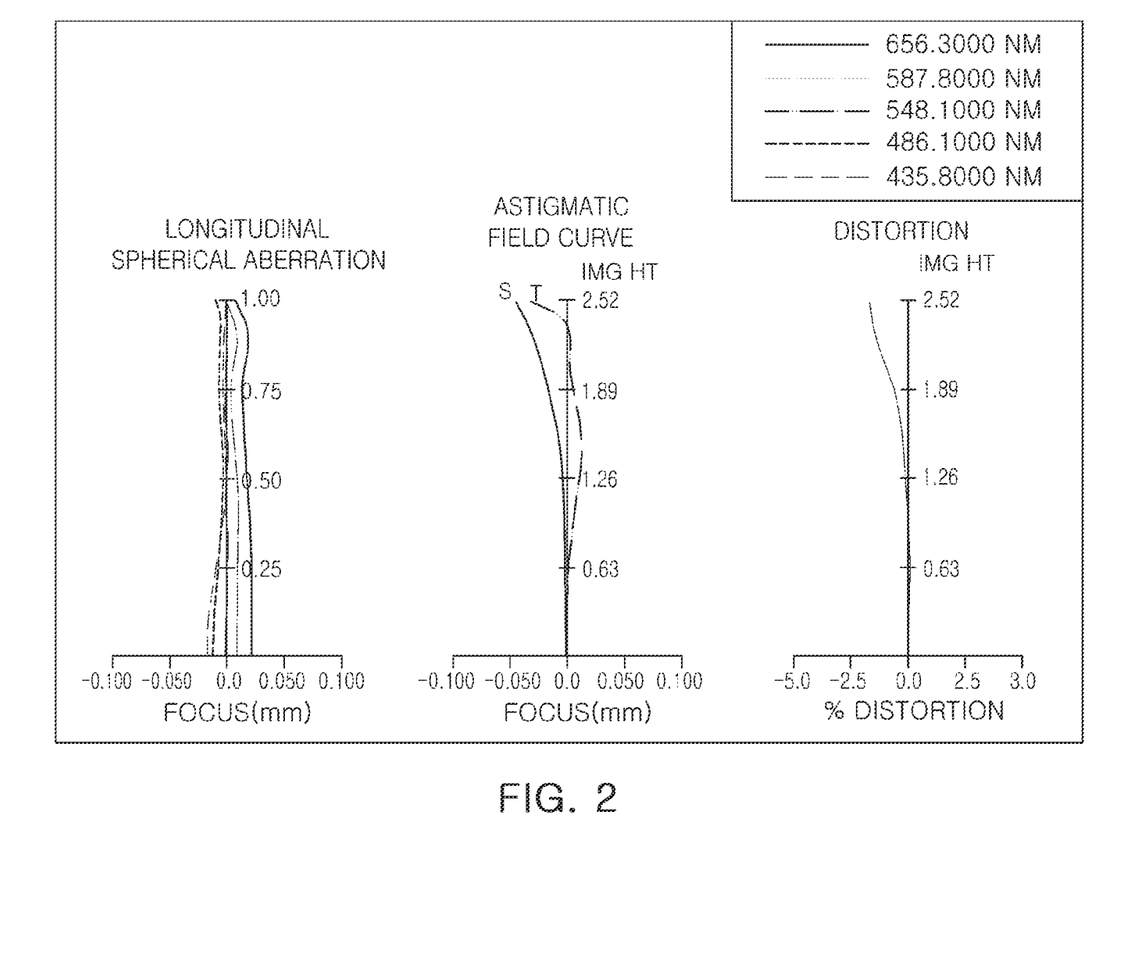
FIG. 2 illustrates aberration curves in a first variable magnification position of the optical imaging system illustrated in FIG. 1.
Figure 3:
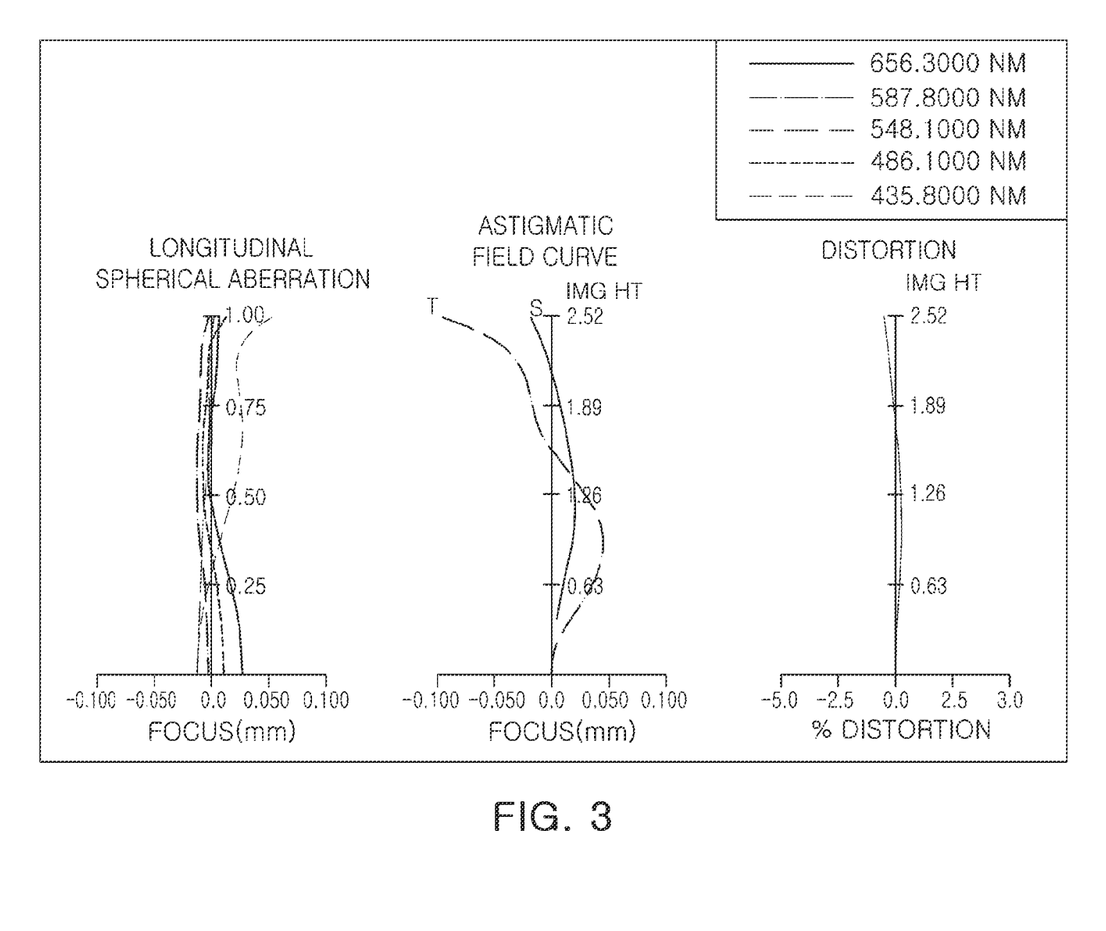
FIG. 3 illustrates aberration curves in a second variable magnification position of the optical imaging system illustrated in FIG. 1.

The lens groups G1, G2, and G3 may move in an optical direction to swiftly adjust a focus of the optical imaging system. For example, at least one or more of the first lens group G1, the second lens group G2, and the third lens group G3 may move in an optical direction such that a clear image of a subject may be imaged on the imaging plane. Further, the first lens group G1, the second lens group G2, and the third lens group G3 may move by different distances in an optical direction to significantly reduce the amount of displacement for focal adjustment. The optical imaging system 100 may have aberration characteristics illustrated in FIGS. 2 and 3.

The optical imaging system 100 may include the prism 102, a stop ST, a filter 180, and an image sensor 190.

The prism 102 may be disposed in front of the first lens 110. The prism 102 may refract light reflected from an object side to the first lens 110.

The filter 180 may be disposed in front of the image sensor 190, and may block infrared light, and the like, included in incident light. The image sensor 190 may include a plurality of optical sensors. The image sensor 190 may be configured to convert an optical signal into an electrical signal.

Table 1 lists characteristics of the lenses of the optical imaging system 100, Table 2 lists aspheric values of the optical imaging system 100, and Table 3 lists distance values between the lens groups in a first position and a second position of the optical imaging system 100.

TABLE 1 f = 6.0~9.0 First Example F No. = 2.2~3.0

| Surface No. | Note | Radius of Curvature | Thickness/ Distance | EFL (e-line) | index | Abber No. |
|---|---|---|---|---|---|---|
| obj | | infinity | infinity | | | |
| 1 | Prism | infinity | 2.320 | | 1.6349 | 23.9 |
| 2 | | infinity | 2.320 | | 1.6349 | 23.9 |
| 3 | | infinity | 0.700 | | | |
| 4* | First lens | 22.0000 | 0.800 | 22.381 | 1.6349 | 23.9 |
| 5* | | −40.7794 | 0.250 | | | |
| 6* | Second lens | 5.2882 | 0.800 | −7.426 | 1.5441 | 56 |
| 7* | | 2.1735 | 0.400 | | | |
| 8 | Stop | infinity | D1 | | | |
| 9* | Third lens | 2.4358 | 1.000 | 3.23 | 1.5441 | 56 |
| 10* | | −5.4819 | 0.300 | | | |
| 11* | Fourth lens | −2.6572 | 0.550 | −9.592 | 1.66 | 20.4 |
| 12* | | −4.9126 | 0.346 | | | |
| 13* | Fifth lens | −137.6539 | 0.506 | 10.663 | 1.5441 | 56 |
| 14* | | −5.5984 | D2 | | | |
| 15* | Sixth lens | −3.8212 | 1.480 | 42.59 | 1.66 | 20.4 |
| 16* | | −3.8920 | 0.366 | | | |
| 17* | Seventh lens | 11.0643 | 0.500 | −5.813 | 1.5441 | 56 |
| 18* | | 2.4288 | D3 | | | |
| 19 | Filter | infinity | 0.210 | | 1.5167 | 64.1 |
| 20 | | infinity | 0.340 | | | |
| 21 | Imaging Plane | infinity | 0.002 | | | |

TABLE 2

| Surface No. | K | A | B | C | D | E | F | G |
|---|---|---|---|---|---|---|---|---|
| 4 | 35.0588481 | 0.00605825 | −0.0011302 | 0.00027913 | −8.82E−05 | 2.07E−05 | 3.31E−07 | −2.55E−07 |
| 5 | 0 | 0.02118025 | −0.0082438 | 0.0017682 | −0.000318 | 9.99E−05 | −1.75E−05 | 2.25E−06 |
| 6 | 0 | −0.0054839 | −0.0087683 | 0.00119182 | 0.00010743 | | | |
| 7 | 0 | −0.042412 | −0.0015924 | | | | | |
| 9 | 0 | −0.0054625 | −0.0002251 | 0.0001103 | 0.00025993 | −1.46E−04 | 3.07E−05 | −2.63E−07 |
| 10 | 0 | 0.00888872 | 0.00504013 | −0.0007601 | 0.00012551 | −2.85E−04 | 5.83E−05 | 1.34E−07 |
| 11 | 0 | 0.05573568 | 0.00013543 | −0.0021669 | −0.0002342 | | | |
| 12 | 0 | 0.03494754 | 0.00191593 | −0.0014391 | −0.000219 | | | |
| 13 | 0 | −0.0186447 | −0.0001701 | 0.00112704 | 0.00137094 | −4.31E−04 | 5.76E−06 | −2.78E−07 |
| 14 | 0 | 3.86E−04 | −9.08E−03 | 4.85E−03 | 1.50E−04 | −2.88E−04 | 4.21E−05 | −2.27E−07 |
| 15 | 0 | 3.42E−02 | −1.76E−02 | 5.28E−03 | −2.87E−04 | −2.32E−04 | 2.00E−07 | −1.20E−13 |
| 16 | 0 | 3.27E−02 | −1.73E−02 | 5.48E−03 | 2.20E−04 | −3.67E−04 | 4.18E−05 | 2.27E−08 |
| 17 | 0 | −1.02E−01 | 1.52E−02 | 4.09E−03 | −1.55E−03 | 1.44E−04 | | |
| 18 | 0 | −1.44E−01 | 4.79E−02 | −1.16E−02 | 1.54E−03 | −8.97E−05 | | |

TABLE 3

| | 1st Position | 2nd Position |
|---|---|---|
| D1 | 1.6775 | 0.2 |
| D2 | 1.3325 | 0.6 |
| D3 | 0.8 | 3 |

Figure 4:
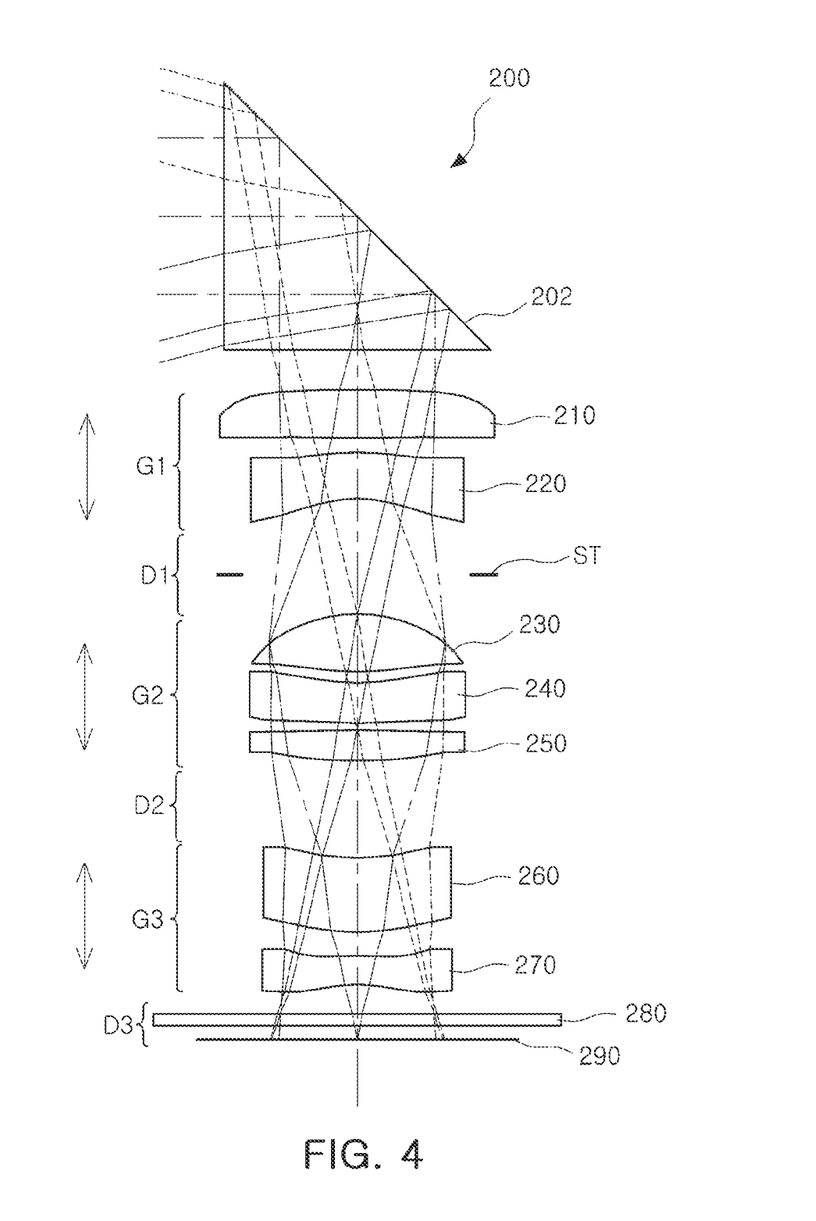
FIG. 4 is a diagram illustrating a second example of an optical imaging system.

A second example of the optical imaging system will be described with reference to FIG. 4.

The optical imaging system 200 may include a prism 202, a first lens 210, a second lens 220, a third lens 230, a fourth lens 240, a fifth lens 250, a sixth lens 260, and a seventh lens 270, and may be divided into a plurality of lens groups. For example, the optical imaging system 200 may be divided into a first lens group G1, a second lens group G2, and a third lens group G3. The first lens group G1 may include two lenses. For example, the first lens group G1 may include the first lens 210 and the second lens 220. The first lens 210 may have positive refractive power, and may have a convex object-side surface and a convex image-side surface. The second lens 220 may have negative refractive power, and may have a convex object-side surface and a concave image-side surface. The second lens group G2 may include three lenses. For example, the second lens group G2 may include the third lens 230, the fourth lens 240, and the fifth lens 250. The third lens 230 may have positive refractive power, and may have a convex object-side surface and a convex image-side surface. The fourth lens 240 may have negative refractive power, and may have a concave object-side surface and a convex image-side surface. The fifth lens 250 may have positive refractive power, and may have a convex object-side surface and a convex image-side surface. The third lens group G3 may include two lenses. For example, the third lens group G3 may include the sixth lens 260 and the seventh lens 270. The sixth lens 260 may have positive refractive power, and may have a concave object-side surface and a convex image-side surface. The seventh lens 270 may have negative refractive power, and may have a convex object-side surface and a concave image-side surface.

The lens groups G1, G2, and G3 may move in an optical direction to change a focal length of the optical imaging system. For example, a distance D1 between the first lens group G1 and the second lens group G2 and a distance D2 between the second lens group G2 and the third lens group G3 may be reduced as a focal length of the optical imaging system is lengthened. Also, a distance D3 between the third lens group G3 and the imaging plane may be increased as a focal length of the optical imaging system is lengthened.

Figure 5:
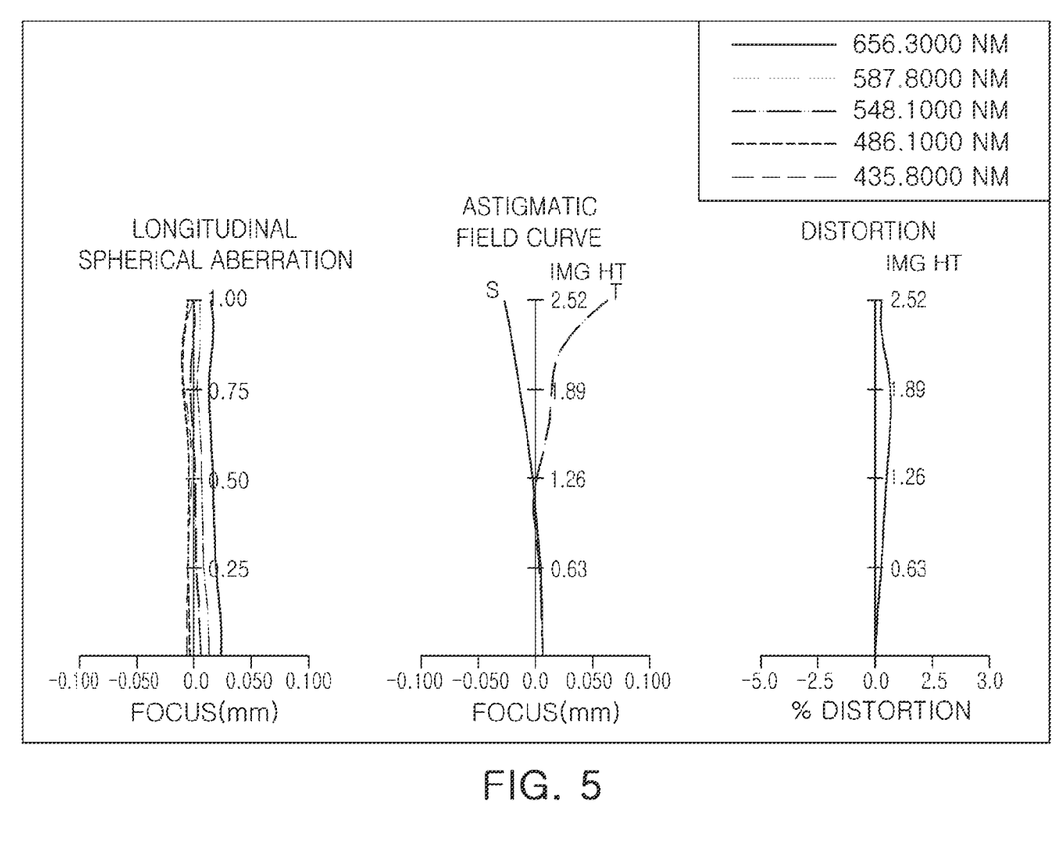
FIG. 5 illustrates aberration curves in a first variable magnification position of the optical imaging system illustrated in FIG. 4.
Figure 6:
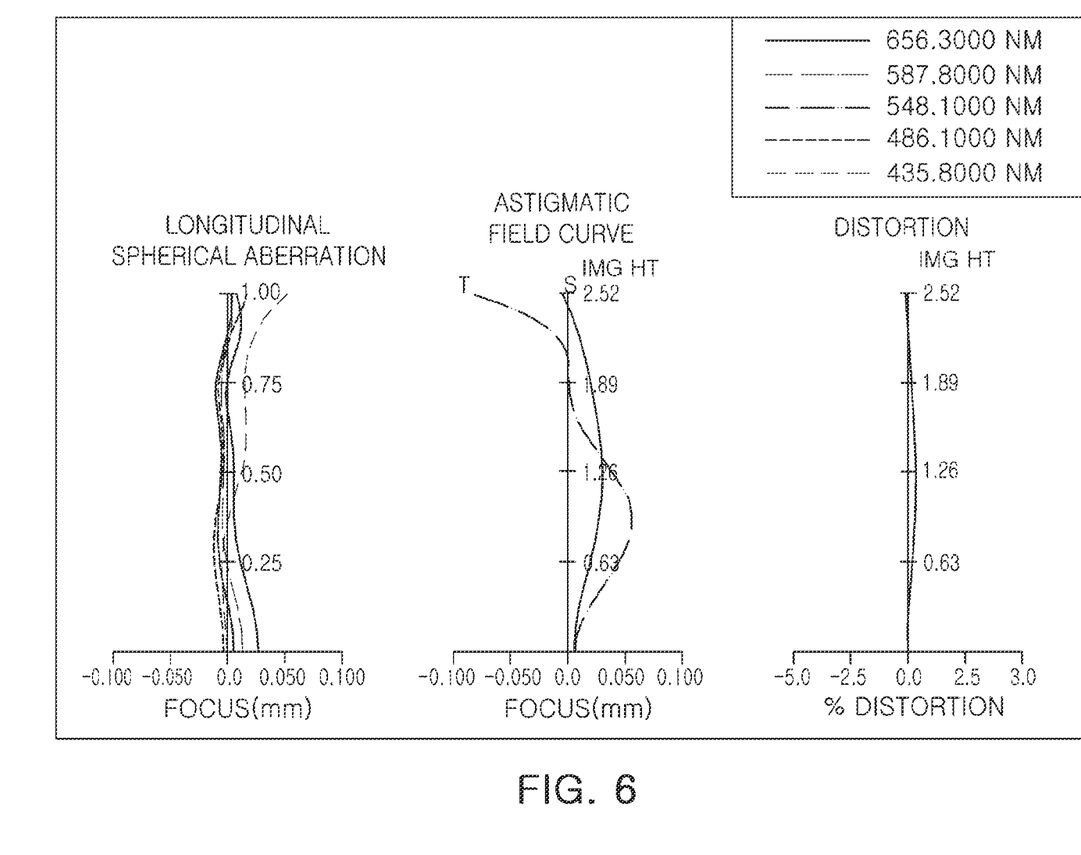
FIG. 6 illustrates aberration curves in a second variable magnification position of the optical imaging system illustrated in FIG. 4.

The lens groups G1, G2, and G3 may move in an optical direction to swiftly adjust a focus of the optical imaging system. For example, at least one or more of the first lens group G1, the second lens group G2, and the third lens group G3 may move in an optical direction such that a clear image of a subject may be imaged on the imaging plane. Further, the first lens group G1, the second lens group G2, and the third lens group G3 may move by different distances in an optical direction to significantly reduce the amount of displacement for focal adjustment. The optical imaging system 200 may have aberration characteristics illustrated in FIGS. 5 and 6.

The optical imaging system 200 may include the prism 202, a stop ST, a filter 280, and an image sensor 290.

The prism 202 may be disposed in front of the first lens 210. The prism 202 may refract light reflected from an object side to the first lens 210.

The filter 280 may be disposed in front of the image sensor 290, and may block infrared light, and the like, included in incident light. The image sensor 290 may include a plurality of optical sensors. The image sensor 290 may be configured to convert an optical signal into an electrical signal.

Table 4 lists characteristics of the lenses of the optical imaging system 200, Table 5 lists aspheric values of the optical imaging system 200, and Table 6 lists distance values between the lens groups in a first position and a second position of the optical imaging system 200.

TABLE 4 f = 6.0~9.0 Second Example F No. = 2.2~3.0

| Surface No. | Note | Radius of Curvature | Thickness/ Distance | EFL (e-line) | index | Abber No. |
|---|---|---|---|---|---|---|
| obj | | infinity | infinity | | | |
| 1 | Prism | infinity | 2.32 | | 1.6349 | 23.9 |
| 2 | | infinity | 2.32 | | 1.6349 | 23.9 |
| 3 | | infinity | 0.7 | | | |
| 4* | First lens | 800.25 | 0.8312 | 28.430 | 1.6349 | 23.9 |
| 5* | | −18.64867 | 0.2500 | | | |
| 6* | Second lens | 4.110698 | 0.8000 | −7.719 | 1.5311 | 55.7 |
| 7* | | 1.91775 | 0.3725 | | | |
| 8 | Stop | infinity | D1 | | | |
| 9* | Third lens | 2.40281 | 1.0000 | 3.286 | 1.5311 | 55.7 |
| 10* | | −5.54501 | 0.1958 | | | |
| 11* | | −3.570563 | 0.7043 | −9.520 | 1.66 | 20.4 |
| 12* | Fourth lens | −8.791745 | 0.1200 | | | |
| 13* | | 15.54871 | 0.5283 | 11.699 | 1.5311 | 55.7 |
| 14* | Fifth lens | −10.30075 | D2 | | | |
| 15* | Sixth lens | −3.953767 | 1.2805 | 31.939 | 1.66 | 20.4 |
| 16* | | −3.767758 | 0.4127 | | | |
| 17* | Seventh lens | 11.06313 | 0.5000 | −5.998 | 1.5311 | 55.7 |
| 18* | | 2.442708 | D3 | | | |
| 19 | Filter | infinity | 0.21 | | 1.5167 | 64.1 |
| 20 | | infinity | 0.339993 | | | |
| 21 | Imaging Plane | infinity | −0.005876 | | | |

TABLE 5

| Surface No. | K | A | B | C | D | E | F | G |
|---|---|---|---|---|---|---|---|---|
| 4 | −99 | 0.01187846 | −0.0026743 | 0.00093406 | −1.16E−04 | −2.38E−06 | 3.28E−06 | −2.56E−07 |
| 5 | 0 | 0.01351841 | −0.0049422 | 0.00264485 | −0.0005382 | 3.00E−05 | 5.95E−06 | 7.55E−07 |
| 6 | 0 | −0.0436161 | 8.15E−05 | 0.00370749 | −0.0015824 | 2.61E−04 | −2.84E−06 | −1.89E−06 |
| 7 | 0 | −0.0830232 | 0.01136849 | −0.0042653 | 0.00081745 | −1.63E−04 | 9.84E−07 | −1.55E−12 |
| 9 | 0 | −0.0067639 | −0.000987 | 0.00037564 | 0.00013021 | −1.54E−04 | 5.26E−05 | −2.63E−07 |
| 10 | 0 | 0.00475946 | 0.00525361 | 0.00061199 | −0.000287 | −2.27E−04 | 5.83E−05 | 1.34E−07 |
| 11 | 0 | 0.02690547 | 0.00438778 | 0.00097024 | −0.0017541 | 2.47E−04 | −2.91E−05 | 2.14E−07 |
| 12 | −7.9787316 | 0.01621541 | 0.00307348 | 0.00242223 | −0.0011522 | −5.23E−04 | 1.53E−04 | −8.72E−09 |
| 13 | 0 | −0.0124493 | −0.0021431 | 0.00231014 | −0.0003794 | −7.53E−06 | 5.76E−06 | −2.78E−07 |
| 14 | 0 | 3.52E−05 | −8.21E−03 | 8.19E−04 | 1.07E−03 | −2.70E−04 | 4.21E−04 | −2.27E−07 |
| 15 | 0 | 2.98E−02 | −1.89E−02 | 5.13E−03 | −2.64E−04 | −2.32E−04 | 2.00E−07 | −1.16E−13 |

TABLE 5-continued

| Surface No. | K | A | B | C | D | E | F | G |
|---|---|---|---|---|---|---|---|---|
| 16 | 0 | 3.58E−02 | −2.03E−02 | 7.55E−03 | −7.23E−04 | −1.45E−04 | 2.18E−05 | 2.27E−08 |
| 17 | 0 | −1.02E−01 | 1.52E−02 | 4.09E−03 | −1.55E−03 | 1.44E−04 | | |
| 18 | 0 | −1.44E−01 | 4.79E−02 | −1.16E−02 | 1.54E−03 | −8.97E−05 | | |

TABLE 6

| | 1st Position | 2nd Position |
|---|---|---|
| D1 | 1.6378 | 0.2 |
| D2 | 1.6826 | 0.9104 |
| D3 | 0.8 | 3 |

The optical imaging system in the examples may have the following characteristics in common. For example, a focal length of the first lens may be within a range of 20 mm to 40 mm, a focal length of the second lens may be within a range of −10 mm to −6.0 mm, a focal length of the third lens may be within a range of within a range of 2 mm to 4 mm, a focal length of the fourth lens may be within a range of −15 mm to −8.0 mm, a focal length of the fifth lens may be within a range of 8 mm to 15 mm, a focal length of the sixth lens may be 30 mm or greater, and a focal length of the seventh lens may be within a range of −10 mm to −4.0 mm. As another example, a focal length of the optical imaging system at a wide-angle end may be within a range of 5.0 mm to 7.0 mm, and a focal length of the optical imaging system at a telephoto end may be within a range of 8.0 mm to 10.0 mm.

At a wide-angle end of the optical imaging system, a distance D1 between the first lens group and the second lens group may be greater than a distance D3 between the third lens group and the imaging plane, and a distance D2 between the second lens group and the third lens group may be greater than the distance D3 between the third lens group and the imaging plane. At a wide-angle end of the optical imaging system, D1/D2 may be within a range of 0.9 to 1.3, D2/D3 may be within a range of 1.5 to 2.2, and D1/D3 may be within a range of 1.5 to 3.5.

At a telephoto end of the optical imaging system, the distance D1 between the first lens group and the second lens group may be smaller than the distance D2 between the second lens group and the third lens group, and the distance D2 between the second lens group and the third lens group may be smaller than the distance D3 between the third lens group and the imaging plane. At a telephoto end of the optical imaging system, D1/D2 may be within a range of 0.2 to 0.4, D2/D3 may be within a range of 0.2 to 0.4, and D3/D1 may be within a range of 14 to 16.

Table 7 lists values of the conditional expressions of the optical imaging system of the first and second examples. As indicated in Table 7, the optical imaging system may satisfy all of the aforementioned conditional expressions.

TABLE 7

| Conditional Expression | 1st Example | 2nd Example |
|---|---|---|
| R2/f | −0.91365 | −0.92417 |
| (R1 + R2)/(R1 − R2) | −0.38473 | −0.39535 |
| f/f1 | 0.26808 | 0.21104 |
| f/f3 | 1.85759 | 1.82593 |
| f/f4 | −0.62552 | −0.63025 |
| f/f5 | 0.56269 | 0.51286 |
| N6-N7 | 0.11590 | 0.12890 |

According to the examples, a curved optical imaging system capable of varying a focal length and having a reduced size may be implemented. The examples provide an optical imaging system having a variable magnification function while having a reduced size.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
   a first lens group comprising a first lens having positive refractive power and a second lens having negative refractive power;
   a second lens group comprising a third lens having positive refractive power, a fourth lens having negative refractive power, and a fifth lens; and
   a third lens group comprising a sixth lens and a seventh lens having negative refractive power,
   wherein the first to seventh lenses are sequentially disposed from an object side.

2. The optical imaging system of claim 1, wherein the first lens comprises a convex image-side surface.

3. The optical imaging system of claim 1, wherein the second lens comprises a convex object-side surface, and the third lens comprises a convex object-side surface.

4. The optical imaging system of claim 1, wherein the fourth lens comprises a concave object-side surface and a convex image-side surface.

5. The optical imaging system of claim 1, wherein the fifth lens comprises a convex image-side surface.

6. The optical imaging system of claim 1, wherein the sixth lens comprises a concave object-side surface and a convex image-side surface.

7. The optical imaging system of claim 1, wherein the seventh lens comprises a concave image-side surface.

8. The optical imaging system of claim 1, further comprising a reflective prism disposed on an object side of the first lens.

9. The optical imaging system of claim 1, wherein $-1.5 < f/f4 < -0.2$, where f is a focal length of the optical imaging system and f4 is a focal length of the fourth lens.

10. The optical imaging system of claim 1, wherein $0.2 < f/f5 < 1.0$, where f is a focal length of the optical imaging system and f5 is a focal length of the fifth lens.

11. The optical imaging system of claim 1, wherein the first to third lens groups are configured to move in an optical axis direction.

12. The optical imaging system of claim 1, wherein the first lens group has negative refractive power, the second lens group has positive refractive power, and the third lens group has negative refractive power.

13. The optical imaging system of claim 1, wherein at a wide-angle end of the optical imaging system, a distance D1 between the first lens group and the second lens group is greater than a distance D3 between the third lens group and an imaging plane, and a distance D2 between the second lens group and the third lens group is greater than D3.

14. The optical imaging system of claim 1, wherein at a telephoto end of the optical imaging system, a distance D1 between the first lens group and the second lens group is smaller than a distance D2 between the second lens group and the third lens group, and D2 is smaller than a distance D3 between the third lens group and an imaging plane.

* * * * *